United States Patent [19]
Gallant et al.

[11] Patent Number: 5,802,466
[45] Date of Patent: Sep. 1, 1998

[54] PERSONAL COMMUNICATION DEVICE VOICE MAIL NOTIFICATION APPARATUS AND METHOD

[75] Inventors: John K. Gallant; Kevin T. Reynolds, both of Plano, Tex.

[73] Assignee: MCI Communications Corporation, Washington, D.C.

[21] Appl. No.: 670,877

[22] Filed: Jun. 28, 1996

[51] Int. Cl.$^6$ ........................................................ H04Q 7/20
[52] U.S. Cl. ........................ 455/413; 455/31.2; 455/412; 455/414; 379/67
[58] Field of Search ...................................... 455/412, 413, 455/414, 566, 31.2, 31.3; 379/67, 88, 89, 68, 70; 340/825.44

[56] References Cited

U.S. PATENT DOCUMENTS

| | | | |
|---|---|---|---|
| 4,625,081 | 11/1986 | Lotito et al. | 379/88 |
| 4,926,461 | 5/1990 | Kuok | 379/67 |
| 4,932,042 | 6/1990 | Baral et al. | 379/67 |
| 4,941,203 | 7/1990 | Patsiokas et al. | 455/53 |
| 4,964,156 | 10/1990 | Blair | 379/189 |
| 5,063,588 | 11/1991 | Patsiokas et al. | 379/57 |
| 5,177,780 | 1/1993 | Kasper et al. | 379/59 |
| 5,313,515 | 5/1994 | Allen et al. | 379/59 |
| 5,402,466 | 3/1995 | Delahanty | 379/44 |
| 5,428,663 | 6/1995 | Grimes et al. | 455/31.3 |
| 5,486,506 | 1/1996 | Recht et al. | 379/88 |
| 5,664,009 | 9/1997 | Hurst et al. | 379/88 |
| 5,682,148 | 10/1997 | Gaskill et al. | 340/825.44 |

FOREIGN PATENT DOCUMENTS

91/01604  2/1991  WIPO .

*Primary Examiner*—Dwayne D. Bost
*Assistant Examiner*—Nay Maung

[57] ABSTRACT

A communication system includes at least one mobile communication device having a message indicator device, and a voice mail messaging center. The voice mail messaging center includes a voice mailbox associated with the at least one mobile communication device. The voice mail messaging center directs a call to the voice mailbox associated with the at least one mobile communication device for recording a message when the mobile communication device is unable to receive the call. The voice mail messaging center optimizes communication from the messaging center to the mobile communication device by sending a first message indicator to the mobile communication device when a voice mail message is recorded and the voice mailbox previously contained no messages, a second message indicator when the voice mailbox is full, and a third message indicator when the voice mailbox becomes empty. The indicator device of the mobile communication device provides a first indication in response to the first message indicator, a second indication in response to the second message indicator, and a third indication in response to the third message indicator.

27 Claims, 3 Drawing Sheets

PERSONAL COMMUNICATION DEVICE VOICE MAIL NOTIFICATION APPARATUS AND METHOD

BACKGROUND OF THE INVENTION

1. Field of the Invention

The present invention relates to a communication system. More particularly, the present invention relates to a mobile communication system having a voice mail messaging capability.

2. Description of the Related Art

U.S. Pat. No. 5,177,780 to Kasper et al. discloses a communication system that notifies mobile radiotelephone subscribers of waiting voice mail messages stored in a voice mail system (VMS) that functions as a central answering machine for land-switched, as well as mobile telephone subscribers. Each subscriber to the VMS answering service is assigned a "mailbox" on a disk storage device of the VMS for recording messages. In conventional land-switched phone networks, the called party is notified of waiting messages by a message waiting lamp, such as a visual indicator light, which is included with the subscriber telephone set. Different notification techniques are provided for different subscriber equipment. In the case of a mobile subscriber, the mobile equipment may not having a message waiting lamp, so the mobile subscriber must be notified in a different way. According to Kasper et al., a mobile subscriber receives an audible notification of a waiting message when the subscriber subsequently receives a call or originates a call signifying that one or more incoming calls have been transferred to the VMS system. That is, when the mobile subscriber originates or answers a call when a voice mail message is waiting in the VMS, an audible notification, such as a burst of a special tone, alerts the subscriber at the outset of an active call that there are one or more newly received voice mail messages in the subscriber's mailbox.

U.S. Pat. No. 5,313,515 to Allen et al. discloses a communication system having a voice mail message notification system for notifying mobile subscribers of newly received voice mail when the mobile telephone registers with the communication system, that is, when the mobile subscriber equipment makes a transition from a state where the equipment is unable to make or receive calls to a state where the equipment is able to do so. The system originates a call providing a recorded voice announcement if there are unread messages in the subscriber's mailbox and the subscriber can retrieve the messages at the time of notification, such as by keying a predefined key, or alternatively, the system may play the messages automatically unless the subscriber takes some predefined action, such as terminating the call. According to Allen et al., the voice mail system monitors the status of each voice mailbox and notifies mobile subscribers of messages by sending a "message waiting" signal to a central exchange office connected to the mobile subscriber. The voice mail system sends the notification only when the status changes from no unread messages to one unread message. The central exchange office sends the message waiting notification to the mobile subscriber at every opportunity until the status of the mailbox changes to having no unread messages.

In both of these prior art voice mail notification systems, communication traffic in the network is not minimized because notification of waiting messages is sent to the mobile subscriber at every opportunity until the status of the mailbox changes. While the Allen et al. system notifies a mobile subscriber only when the status of a subscriber's mailbox changes from no unread messages to one unread message, the mobile subscriber is notified by the central exchange office at each opportunity. Even though the overall amount of communication traffic within the system is reduced, communication traffic within the network in the Allen et al. system is not minimized.

SUMMARY OF THE INVENTION

The present invention provides a system and method for notifying mobile subscribers of unread messages in a voice mailbox while simultaneously minimizing communication traffic in the network. According to the invention, a communication system includes at least one mobile communication device, such as a personal communication device or a cellular telephone, having a message indicator device, and a voice mail messaging center having a voice mailbox associated with the at least one mobile communication device. The voice mailbox has a capacity for containing a predetermined number of voice messages and/or a predetermined total amount of time of voice messages. The voice mail messaging center directs a call for the at least one mobile communication device to the voice mailbox associated with the at least one mobile communication device for recording a message when the mobile communication device is unable to receive the call.

The voice mail messaging center monitors the mailbox of the mobile communication device and sends a first message indicator to the mobile communication device when a voice mail message is recorded and the voice mailbox contained no messages before the voice mail message was recorded.

A second message indicator is sent to the mobile communication device from the voice mail messaging center when the voice mailbox contains the predetermined number of voice mail messages and/or contains the predetermined amount of time of voice mail messages. Preferably, the second indication indicates that the voice mailbox is full.

A third message indicator is sent to the mobile communication device from the voice mail messaging center when the voice mailbox becomes empty. A fourth message indicator is sent to the mobile communication device from the voice messaging center when the amount of voice mail messages contained in the voice mailbox exceeds a predetermined threshold of voice mail messages contained in the voice mailbox.

When the call contains additional information related to message priority, a fifth indicator is sent to the mobile communication device from the voice message center.

The mobile communication device includes a memory for storing the first, second, third, fourth and fifth message indicators. The mobile communication device also includes an indicator device that provides a first indication in response to the first message indicator, a second indication in response to the second message indicator, a third indication in response to the third message indicator, a fourth indication in response to the fourth message indicator, and a fifth indication in response to the fifth message indicator.

The present invention also provides a method for optimizing communication traffic from a voice mail message center to a mobile communication device for indicating a status of a voice mailbox to the mobile communication device. The method comprises the steps of (1) sending a first indication to the mobile communication device from the voice mail messaging center when the contents of the voice mailbox changes from having no messages to having a new message, (2) sending a second indication to the mobile communication device from the voice mail messaging center when the voice mailbox becomes full, (3) sending a third indication to the mobile communication device from the voice mail messaging center when the voice mailbox becomes empty, (4) sending a fourth indication to the mobile communication device from the voice mail messaging center when the voice mailbox contains an amount of voice mail messages greater than a predetermined amount of voice mail messages, and (5) sending a fifth indication to the mobile communication device from the voice mail messaging center when the call contains additional information related to message priority.

The system generates a first message indication at the mobile communication device in response to the first indication; a second message indication at the mobile communication device in response to the second indication; a third message indication at the mobile communication device in response to the third indication; a fourth message indication at the mobile communication device in response to the fourth indication; and a fifth message indication at the mobile communication device in response to the fifth indication. The first, second, third, fourth and fifth message indications are received by the mobile communication device and stored at the mobile communication device.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

Figure 1:
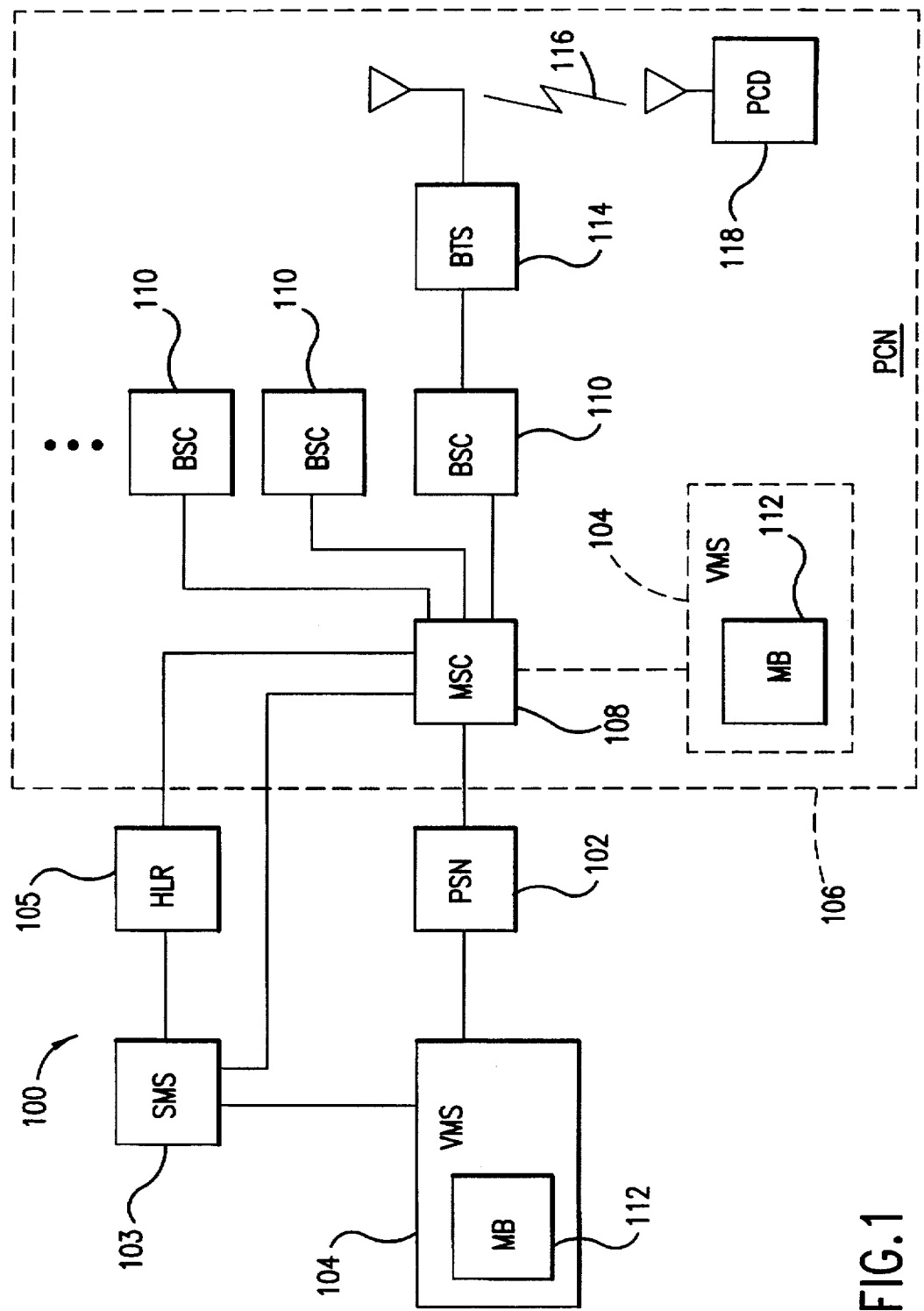
FIG. 1 shows a schematic block diagram of a mobile communication system according to the present invention.

FIG. 1 shows a schematic block diagram of a personal communication network system 100 having voice mail notification features according to the present invention. System 100 includes a public switched network (PSN) 102 connected to a voice mail system (VMS) (also called a message center) 104, a short message system (SMS) 103, a Home Location Register HLR 105 and a personal communication network (PCN) 106. PCN 106 includes a mobile switch service center (MSC) 108 connected to a plurality of base station controllers (BSC, hereafter) 110 in a well-known manner. Each BSC 110 of the system is connected in a well-known manner to a plurality of base transceiver stations (BTS) 114, of which only one BTS is shown. BTS 114 communicates in a well-known manner via a wireless (e.g., radio frequency) communications link 116 with a plurality of personal communication devices (PCD) 118, of which only one PCD is shown. In an alternative configuration, VMS 104 can be connected to MSC 108 within PCN 106 if PSN 102 does not offer a voice mail service.

As would be apparent to a person skilled in the art, the PSN 102, SMS 103, VMS 104, HLR 105, PCN 106, MSC 108, BSC 110, mailbox 112, BTS 114, and wireless link 116 can be implemented in accordance with commercially available hardware and software. Transfer of control and data signals between these elements is accomplished by conventional bidirectional and/or unidirectional signaling network (s), as would be apparent to a person skilled in the relevant art.

Calls originating within PSN 102 for PCD 118 are directed to MSC 108 by PSN 102. MSC 108 directs the call in a well-known manner to the particular BSC 110 associated with the microcell in which PCD 118 is located. BSC 110 controls the particular BTS 114 associated with the microcell in which PCD 118 is located, for completing the call using wireless link 116. Calls originating within PCN 106 for PCD 118 are directed to PCD 118 by the system in a well-known manner. When a call to PCD 118 cannot be completed because (for example, PCD 118 is turned off, located outside the region covered by PCN 106 or is busy), the call is directed to VMS 104 if the called mobile subscriber subscribes to the voice mail service provided by VMS 104 for recording a voice mail message. Calls received by VMS 104 are directed to the appropriate mailbox 112.

The HLR 105 keeps track of whether the PCD 118 is "registered" (e.g., "on the air"), in a known manner, and if so, where (e.g., which MSC 110 is handling the communications). Besides "where" information (e.g., location of the PCD 118), which is called mobility information, the HLR 105 also stores subscriber profile information. For this application, the HLR 105 stores whether there are outstanding voicemail alert messages for the subscriber. When a voice mail message is left by a caller, a signal is sent from the VMS 104 to the SMS 103 indicating that a message has been received. The SMS 103 then interfaces with the HLR 105 to determine whether the PCD 118 associated with the recipient of the voice mail message is currently registered. If the recipient's PCD 118 is registered, the HLR 105 passes this information on to the SMS 103. The SMS 103 then sends an appropriate notification to the PCD 118 in accordance with the present invention as described below. If the recipient is not registered, the HLR 103 sets a flag that a message has been received but not forwarded. The next time the PDC 118 registers, the HLR 105 signals this fact to the SMS 103, which then sends an appropriate notification to the PCD 118 in accordance with the present invention.

VMS 104 has a mailbox 112 for each subscriber to the voice mail service. As an example, the subscriber of PCD 118 has been assigned mailbox 112 of FIG. 1. Typically, the voice mail capacity of each mailbox will be based on a predetermined number of messages and/or a total length of message time regardless of the number of messages stored in the mailbox 112, or some combination thereof.

VMS 104 monitors the contents of each mailbox 112 and notifies each associated PCD 118 of status changes for each respective mailbox in accordance with the method described above in connection with the functionality of the PSN 102, SMS 103, VMS 104, HLR 105, MSC 108, BSC 110, and BTS 114. Alternatively, and as would be apparent to a person skilled in the relevant art, the VMS 104, for example, can include extended functionality to directly notify the PCD 118. The functionality performed by elements PSN 102, SMS 103, VMS 104, HLR 105, MSC 108, BSC 110, and BTS 114 can be modified to yield still further combinations without departing from the scope of the present invention. Thus, to simplify the remaining description of the present invention, rather than repeat the above details that explain how status changes of each mailbox 112 are communicated to the respective PCD 118, the remaining description includes general phrases such as "the VMS 104 sends notification to PCD 118." Such general phrases are not intended in any way to limit the present invention.

To minimize traffic on the network, the present invention provides an optimized mode of operation that can be selected by the subscriber, preprogrammed into the PCD 118 or specified statistically or dynamically by the VMS 104. In the optimized mode of operation, VMS 104 sends a single notification to PCD 118 for each of a plurality of selected status changes of mailbox 112 that occurs. Examples of selected status changes are when mailbox 112 becomes unempty, becomes full, becomes empty, exceeds a predetermined percentage-full threshold, and receives a message having message priority information. A normal mode of operation can also be selected that does not minimize traffic on the network to the same extent that the optimized mode does, but causes VMS 104 to send notifications to PCD 118 each time one of the selected status changes of mailbox 112 occurs, in addition to when other status changes occur.

For the selected status change when mailbox 112 becomes unempty (that is, when mailbox 112 previously contained no voice mail messages and a new voice mail message is recorded in, stored, or otherwise associated with mailbox 112), VMS 104 sends an unempty mailbox notification to PCN 118. This permits the subscriber to observe that there is at least one unread voice mail message in mailbox 112.

For the selected status change condition when mailbox 112 becomes full, that is, when there are enough voice mail messages contained in mailbox 112 to fill mailbox 112 to its capacity, VMS 104 sends a mailbox full notification to PCD 118 so that the subscriber can observe that mailbox 112 cannot receive any additional messages.

When mailbox 112 becomes empty (that is, when there were voice mail messages previously contained in mailbox 112, but the subscriber or the system has cleared mailbox 112 leaving voice mail messages contained within mailbox 112), VMS sends a mailbox empty notification to PCD 118 upon the clearing of mailbox 112 so that the subscriber knows that there are no unread voice mail messages in mailbox 112. When the empty mailbox notification is removed, that is, when VMS 104 sends an unempty mailbox notification, the subscriber can observe that there is at least one unread voice mail message waiting.

When a voice mail message is stored in mailbox 112 that causes the contents of mailbox 112 to exceed a predetermined percentage-full threshold, VMS 104 sends a percentage-full notification to PCD 118 so the subscriber knows that the predetermined percentage-full threshold of mailbox 112 has been surpassed. For example, if a user or system administrator sets a threshold value equal to 50%, VMS 104 will notify PCD 118 when mailbox 112 becomes greater than 50% full. Of course, other percentage-full threshold can be set to any value provided in addition or in the alternative to the exemplary 50% threshold value. Based on the received notification, the subscriber is provided with an indication of the relative capacity still available for receiving mail messages as messages are recorded in mailbox 112. Thus, the subscriber is able to decide whether mailbox 112 should be emptied in a known manner before becoming filled to capacity.

When a voice mail message having message priority information is stored in mailbox 112, VMS 104 sends a message priority notification to PCD 118. The message priority notification identifies the specific priority of the voice mail message, according to a predetermined priority known to the subscriber. Message priority information can be entered by a person leaving a voice mail message for the subscriber of mailbox 112 by entering a key code in response to a voice mail service menu. Another way message priority-type information can be stored with a voice message is by entering a personal information number (PIN) for the subscriber of mailbox 112 when the message is recorded. With this approach, messages can be assigned a priority level or be screened using ANI (automatic number identification) techniques so a subscriber can screen callers. Alternatively, this screening function can be performed automatically.

In the normal mode of operation VMS 104 sends a new mail notification to PCD 118 each time a new voice mail message is recorded in mailbox 112, thereby causing a change of status of mailbox 112. This normal mode can be made available in addition to sending notifications for the selected status changes already described. The normal mode of operation does not minimize traffic within the network to the same extent as the optimized mode of operation, but network traffic is reduced because of features provided with PCD 118 of the present invention. The normal mode of operation can provide additional notifications for other status changes of mailbox 112, along with the notifications for the status change conditions already described.

Figure 2:
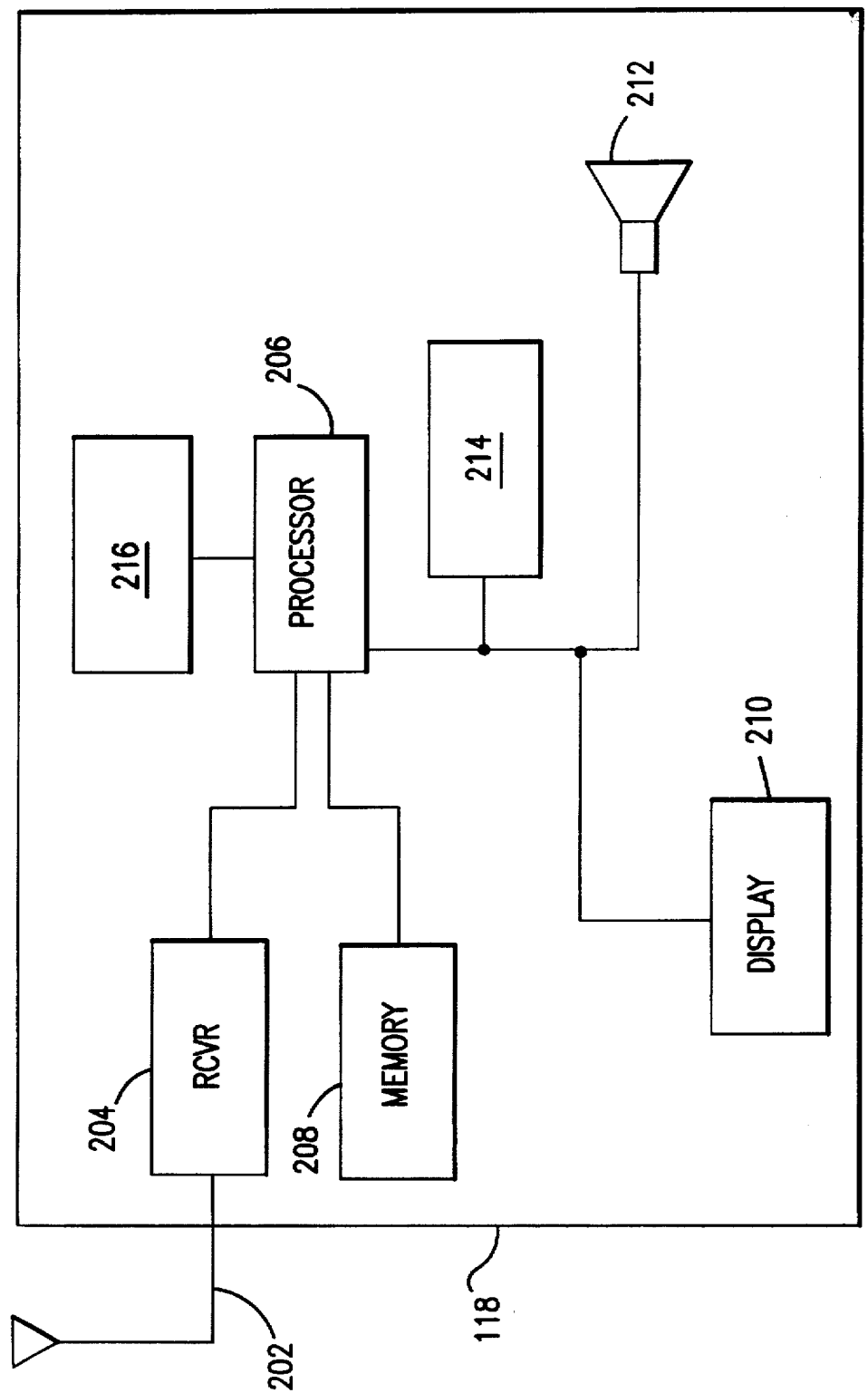
FIG. 2 shows a schematic block diagram of a personal communication device according to the present invention.

FIG. 2 shows that PCD 118 includes an antenna 202 coupled to a receiver portion 204, a processor 206, a memory 208, a display 210, an audible warning device 212, an visual indicator 214 and a mode select switch 216. The output of receiver portion 204 is coupled to processor 206. Processor 206 is coupled to memory 208, display 210, audible warning device 212, visual indicator 214 and mode select switch 216. Preferably, memory 208 is part of a memory used by processor 206 for effectuating other PCD functions provided by PCD 118. Display 210 is preferably an liquid crystal display (LCD), but can be any suitable graphic and/or alphanumeric display that is capable of displaying an icon or a message representing the status of the subscriber's voice mailbox. Audible warning device 212 and visual indicator 214 are not required if PCD 118 includes display 210. However, when PCD 118 does not include display 210, audible warning device 212 is preferably a suitable speaker, a buzzer, or a transducer, and visual indicator 214 is preferably any suitable light or light emitting diode (LED) capable of indicating the voice mail notification aspects of the present invention. Audible warning device 212 could also be embodied as the speaker of a handset of PCD 118, in which case notification would be provided to the subscriber as either a special tone or as a recorded voice message.

Mode select switch 216 is used by the subscriber for selecting the normal or the optimized mode of operation of the present invention. PCD 118 communicates the subscriber's mode of operation selection to VMS 104 in a well-known manner.

Figure 3C:
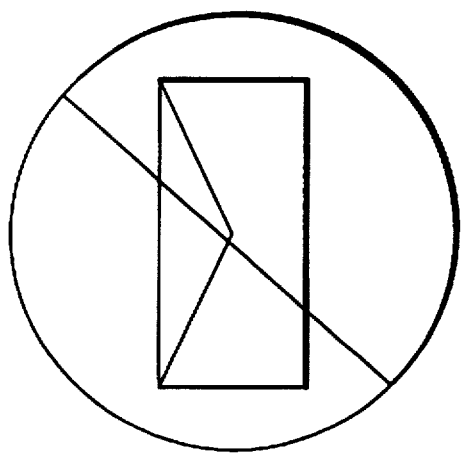
FIGS. 3A–3C show exemplary icons representing status of a voice mailbox according to the present invention.
Figure 3B:
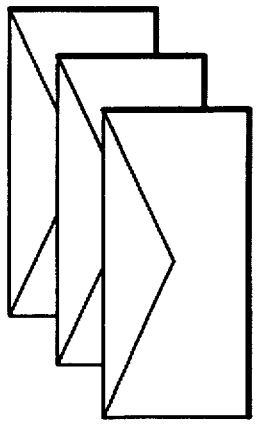
Figure 3A:
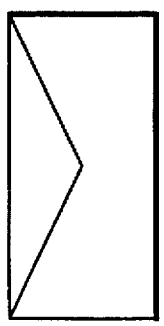

Antenna 202 receives communication information signals transmitted over wireless link 116 from BTS 114 in a well-known manner. Received communication information signals are coupled from antenna 202 to receiver portion 204 and then to processor 206. If the received communication information is a new mail message notification from VMS 104, processor 206 sets a new mail message flag in memory 208 and actuates display 210 for indicating that the status of mailbox 112 has changed from being empty to having at least one unread mail message. FIG. 3A shows a exemplary icon displayed by display 210 for indicating this change of state of mailbox 112.

If the normal mode of operation of the present invention is selected by the subscriber, the new mail message notification is sent from VMS 104 only once each time a new message is stored in mailbox 112. This limitation on the number of times the new mail notification is because memory 208 of PCD 118 stores the current status of mailbox 112 until the status changes. By sending the new mail message notification to PCD 118 only once, communication information traffic from VMS 104 is reduced, thus relieving traffic burden within the network.

If the optimized mode of operation is selected, the only new mail-type message notification sent to PCD 118 is an unempty mailbox notification that is sent when mailbox 112 became unempty.

If a threshold number of voice mail messages are recorded in mailbox 112 so that mailbox 112 becomes full, VMS 104 sends a mailbox full notification to PCD 118. In response, processor 206 sets a full mailbox flag in memory 208 and actuates display 210 for indicating that mailbox 112 is now full. FIG. 3B shows a exemplary icon displayed by display 210 for indicating a full mailbox. In both the normal and the optimized mode of operation, the mailbox full notification is sent only once because memory 208 of PCD 118 stores the full mailbox status of mailbox 112. To change the full status of mailbox 112, the mobile subscriber must reduce the number of recorded voice mail messages stored in the mailbox 112 by deleting them, for example.

When mailbox 112 becomes empty in both the normal and the optimized mode of operation, VMS 104 sends a mailbox empty notification to PCD 118 indicating that there are no voice mail messages in mailbox 112. In response, processor 206 sets an empty mailbox flag in memory 208 and actuates display 210 for indicating an empty mailbox (i.e., no mail). FIG. 3C shows an exemplary icon displayed by display 210 for indicating an empty mailbox. If this icon is not displayed by display 210, then the subscriber will know that mailbox 112 contains at least one unread mail message. Again, if the optimized mode of operation is selected by the subscriber, network traffic is minimized because the empty mailbox notification is sent only once.

Figure 4:
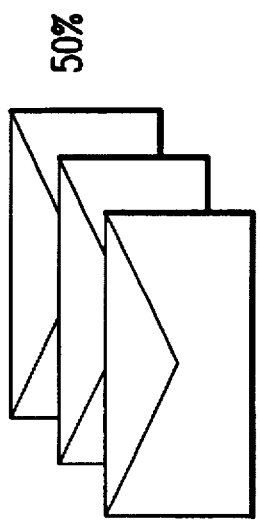
FIG. 4 shows an exemplary icon representing a predetermined percentage-full status of a voice mailbox according to the present invention.

When a percentage-full threshold condition occurs in either the normal mode or the optimized mode, VMS 104 can send a predetermined percentage-full notification to PCD 118 indicating that the amount of messages stored in mailbox 112 exceeds a predetermined percentage-full threshold. In response, processor 206 sets a predetermined percentage-full flag in memory 208 and actuates display 210 for indicating that the predetermined percentage-full threshold has been surpassed. FIG. 4 shows an exemplary icon displayed by display 210 for indicating that a 50% full threshold has been surpassed. Other predetermined percentage-full thresholds can be used in addition or in the alternative to the exemplary 50% full threshold shown in FIG. 4 with corresponding icons indicating the additional or alternative thresholds.

Figure 5:
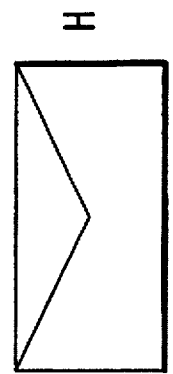
FIG. 5 shows an exemplary icon representing a predetermined message priority status of a message stored in a voice mailbox according to the present invention.

When a voice mail message having message priority information is stored in mailbox 112, VMS 104 can send a message priority notification to PCD 118 that depends upon the particular level of priority of the message. In response, processor 206 sets a message priority flag in memory 208 corresponding to the message priority and actuates display 210 for indicating that a message having a certain level of priority is stored in mailbox 112. FIG. 5 shows an exemplary icon displayed by display 210 for indicating at a high priority message is stored in mailbox 112. Other priority levels or message screening icons can be in addition to or in the alternative to the exemplary high priority message icon shown in FIG. 5.

The present invention is also applicable to a cellular system in which PCN 106 is replaced by a cellular network and PCD 118 is replaced by a cellular telephone.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus, the present invention should not be limited by any of the above-described exemplary embodiments, but should be defined only in accordance with the following claims and their equivalents. All cited patent documents and publications in the above description are incorporated herein by reference.

What is claimed is:

1. A communication system comprising:
    at least one mobile communication device having a message indicator device;
    a voice mail messaging center, said voice mail messaging center having a voice mailbox associated with said at least one mobile communication device, wherein said voice mailbox has a predetermined capacity to store voice messages, wherein said voice mail messaging center directs a call for said at least one mobile communication device to said voice mailbox associated with said at least one mobile communication device for recording a message when said mobile communication device is unable to receive said call, said voice mail messaging center further having
    means for minimizing communication traffic between said communication device and said voice mail messaging center, wherein said minimizing communication traffic means includes
        first means for sending a first message indicator to said mobile communication device when a voice mail message is recorded and said voice mailbox contained no messages before said voice mail message was recorded,
        second means for sending a second message indicator to said mobile communication device when said voice mailbox contains said predetermined capacity of voice mail messages, and
        third means for sending a third message indicator to said mobile communication device when said voice mailbox becomes empty,
    wherein said indicator device of said mobile communication device provides a first indication in response to said first message indicator, a second indication in response to said second message indicator, and a third indication in response to said third message indicator.

2. The communication system according to claim 1, wherein said mobile communication device includes a memory for storing said first, second and third message indicators sent by said voice mail messaging center.

3. The communication system according to claim 2, wherein said indicator device is a liquid crystal display.

4. The communication system according to claim 1, wherein said second indication indicates that said voice mailbox is full.

5. The communication system according to claim 4, wherein said predetermined capacity of said voice mailbox to store voice messages is based on a predetermined number of voice messages.

6. The communication system according to claim 5, wherein said voice mail messaging center further comprises a fourth means for sending a fourth message indicator to said mobile communication device when the number of voice mail messages contained in said voice mailbox exceeds a predetermined threshold of voice mail messages contained in said voice mailbox, and said indicator device of said mobile communication device provides a fourth indication in response to said fourth message indicator.

7. The communication system according to claim 6, wherein said mobile communication device includes a memory for storing said first, second, third and fourth message indicators sent by said voice mail messaging center.

8. The communication system according to claim 6, wherein said call contains additional information, and said voice mail messaging center further comprises fifth means for sending a fifth message indicator to said mobile communication device in response to said additional information contained in said call, and said indicator device of said mobile communication device provides a fifth indication in response to said fifth message indicator.

9. The communication system according to claim 8, wherein said mobile communication device includes a memory for storing said first, second, third, fourth and fifth message indicators sent by said voice mail messaging center.

10. The communication system according to claim 8, wherein said additional information contained in said call is message priority information, and said fifth indication provided by said mobile communication device indicates a message priority related to said message priority information.

11. The communication system according to claim 1, wherein said call contains additional information, and said voice mail messaging center further comprises a fourth means for sending a fourth message indicator to said mobile communication device in response to said additional information contained in said call, and said indicator device of said mobile communication device provides a fourth indication in response to said fourth message indicator.

12. The communication system according to claim 11, wherein said mobile communication device includes a memory for storing said first, second, third and fourth message indicators sent by said voice mail messaging center.

13. The communication system according to claim 11, wherein said additional information contained in said call is message priority information, and said fourth indication provided by said mobile communication device indicates a message priority related to said message priority information.

14. The communication system according to claim 1, wherein said mobile communication device is a personal communication device.

15. The communication system according to claim 1, wherein said mobile communication device is a cellular telephone.

16. The communication system according to claim 1, wherein said predetermined capacity of said voice mailbox to store voice messages is based a predetermined amount of time of voice messages.

17. The communication system according to claim 16, wherein said mobile communication device includes a memory for storing said first, second and third message indicators sent by said voice mail messaging center.

18. The communication system according to claim 17, wherein said voice mail messaging center sends a fourth message indicator to said mobile communication device when an amount of time of voice mail messages contained in said voice mailbox exceeds a predetermined threshold of time of voice mail messages contained in said voice mailbox, and said indicator device of said mobile communication device provides a fourth indication in response to said fourth message indicator.

19. A method of optimizing communication traffic from a voice mail messaging center to a mobile communication device for indicating a status of a voice mailbox of said voice mail messaging center to said mobile communication device, said method comprising said steps of:

sending a first indication to said mobile communication device from said voice mail messaging center when said contents of said voice mailbox changes from having no messages to having a new message;

sending a second indication to said mobile communication device from said voice mail messaging center when said voice mailbox becomes full;

sending a third indication to said mobile communication device from said voice mail messaging center when said voice mailbox becomes empty;

generating a first message indication at said mobile communication device in response to said first indication;

generating a second message indication at said mobile communication device in response to said second indication; and generating a third message indication at said mobile communication device in response to said third indication.

20. The method according to claim 19, further comprising said steps of:

receiving at least one of said sent first message indication at said mobile communication device, said sent second message indication at said mobile communication device, and said sent third message indication at said mobile communication device; and storing at least one of said received first message indication at said mobile communication device, said received second message indication at said mobile communication device, said received second message indication at said mobile communication device.

21. The method according to claim 19, further comprising said steps of:

sending a fourth indication to said mobile communication device from said voice mail messaging center when said voice mailbox contains an amount of voice mail messages greater than a predetermined amount of voice mail messages; and generating a fourth message indicator at said mobile communication device in response to said fourth indication.

22. The method according to claim 21, further comprising said steps of:

receiving said sent fourth message indication at said mobile communication device; and storing said received fourth message indication at said mobile communication device.

23. The system of claim 1, wherein said means for minimizing communication traffic includes a normal operation mode and an optimal operation mode.

24. The system of claim 23, wherein said means for minimizing communication traffic is preprogrammed into said communication device.

25. The system of claim 23, wherein said voice message center sends a single notification to said communication device for each of said message indicators when operating in said optimal operation mode.

26. The system of claim 1, wherein said means for minimizing communication traffic is selected by a subscriber to said voice mail messaging center.

27. The system of claim 26, wherein said communication device includes a mode select switch.

* * * * *